(12) United States Patent
Pattantyus

(10) Patent No.: US 6,404,612 B1
(45) Date of Patent: Jun. 11, 2002

(54) METHOD FOR SYSTEM FOR DRIVING A SOLENOID

(75) Inventor: Tamas I. Pattantyus, Dallas, TX (US)

(73) Assignee: Mykrolis Corporation, Bedford, MA (US)

(*) Notice: Subject to any disclaimer, the term of this patent is extended or adjusted under 35 U.S.C. 154(b) by 0 days.

(21) Appl. No.: 09/351,111

(22) Filed: Jul. 10, 1999

(51) Int. Cl.⁷ ............................................ H01H 47/28
(52) U.S. Cl. ........................................................ 361/187
(58) Field of Search ............................ 361/18, 152, 153, 361/160, 170, 171, 178, 186, 187

(56) References Cited

U.S. PATENT DOCUMENTS

| | | | |
|---|---|---|---|
| 5,660,207 A | 8/1997 | Mudd | 137/599 |
| 5,765,283 A | 6/1998 | Mudd | 29/890 |
| 5,835,330 A | 11/1998 | Kirschner et al. | 361/152 |
| 5,850,850 A | 12/1998 | Mudd | 137/486 |

FOREIGN PATENT DOCUMENTS

| | | | |
|---|---|---|---|
| EP | 0 393 847 A1 | 10/1990 | H01H/47/32 |
| EP | 0 459 919 A1 | 12/1991 | H01H/47/32 |

OTHER PUBLICATIONS

International Search Report dated Dec. 7, 2000.
LM2674: Simple Switcher *Power Converted High Efficiency 500 mA Step–Down Voltage Regulator* by National Semiconductor Corporation dated Sep., 1998.
Silicon Processing for the VLSI Era, pp. 165, 166 No Date.
*A Brief Analysis of the Thermal Mass Flow Sensor Excitation Circuit* by Dwight Larson dated Sep. 23, 1998.

*Primary Examiner*—Ronald W. Leja
(74) *Attorney, Agent, or Firm*—Gray Cary Ware & Freidenrich, LLP

(57) ABSTRACT

A system and method for a pulse width modulated (PWM) solenoid driver with a reduced rate of power consumption. The system for driving a solenoid includes a solenoid, a current set-point for establishing a desired current flow through the solenoid, and a step-down regulator circuit for controlling the current through the solenoid based on the difference between the desired current flow and the actual current flow through the solenoid. The step-down regulator circuit has a low internal resistance of not greater than approximately 1 ohm which contributes to the reduced rate of power consumption for the PWM solenoid driver.

19 Claims, 3 Drawing Sheets

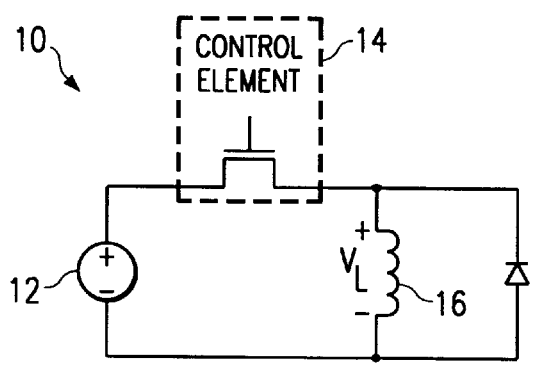
*FIG. 1*
(PRIOR ART)
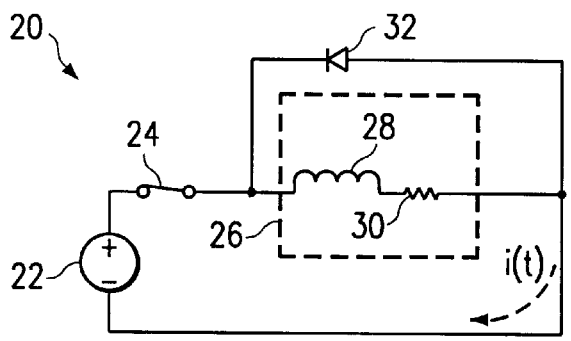
*FIG. 2*
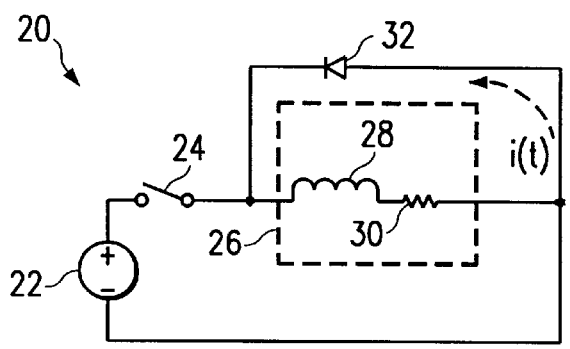
*FIG. 3*
| ELEMENT | VALUE |
|---|---|
| R1 | 392k |
| R2 | 392k |
| R3 | 100k |
| R4 | 100k |
| R5 | 47kΩ |
| R6 | 100kΩ |
| R7 | 10kΩ |
| R8 | 50kΩ |
| R9 | 100kΩ |
| R10 | 50kΩ |
| R11 | 100kΩ |
| R12 | 2.2kΩ |
| R13 | 100kΩ |
| R16 | 100kΩ |
| R15 | 47kΩ |
| R16 | 100kΩ |
| R17 | 100kΩ |
| R18 | 9.09kΩ |
| R19 | 100kΩ |
| R20 | 9.09kΩ |
| R21 | 10kΩ |
| R22 | 100kΩ |
| R23 | 100kΩ |
| R24 | 100kΩ |
| R25 | 9.09kΩ |
| C1 | 47μF |
| C2 | 0.1μF |
| C3 | 10000pF |
| C4 | 10000pF |
| C5 | 4700pF |
| C6 | 47μF |
| C7 | 0.1μF |
| C8 | 10000pF |
| C9 | 10000pF |
| C10 | 10000pF |
| OP-AMPS (72, 80, 90, 100) | TLΦ64 |
*FIG. 7*

METHOD FOR SYSTEM FOR DRIVING A SOLENOID

TECHNICAL FIELD OF THE INVENTION

This invention relates generally to systems and methods for driving a solenoid and, more specifically, to systems and method for driving a solenoid that controls a valve in a mass flow controller (MFC).

BACKGROUND OF THE INVENTION

Many manufacturing processes require that the introduction rates of process gases into a process chamber be strictly controlled. These types of processes use mass flow controllers (MFCs) to control the flow rate of gases. An MFC may control the gas by implementing a solenoid driver circuit to control a valve. The flow rate into the chamber is proportional to the valve opening. In turn, the valve opening is proportional to a current flowing through a solenoid winding.

A basic circuit for typical solenoid driver is shown in FIG. 1. Solenoid driver 10 includes a voltage source 12, a control element 14 such as a transistor, and a load device, solenoid 16. The actual current through solenoid 16 is given by $V_L/R_L$, where $V_L$ is the voltage across solenoid 16 as controlled by device 4, and $R_L$ is the resistance of solenoid 16. $R_L$ may vary as a result of operating temperature in solenoid 16. Solenoid driver 10 is continually controlled by means of changing a voltage across solenoid 16 through the use of control element 14. The impedance of solenoid 16 is both inductive and resistive. Typical inductance values range between 1H–4H, and corresponding resistance values range from 100 Ω–300Ω. Supply voltage 12 used to drive the current in solenoid driver 10 may be in the range of 24 volts (±12 volts) to 36 volts (±18 volts). The voltage $V_L$ applied across solenoid 16 is typically between 10 volts and 18 volts, depending on operating parameters such as the desired valve opening and the pressure drop across the MFC device.

Unfortunately, there are two disadvantages with the typical solenoid driver 10 illustrated in FIG. 1. The first disadvantage is that the force exerted by solenoid 16 is proportional to the current flowing through its windings and only indirectly proportional to the voltage across it. If the solenoid voltage is controlled, an additional time delay is introduced in the feedback loop and this delay may cause stability problems.

A second disadvantage of the circuit shown in FIG. 1 is that power is often wasted in control element 14, especially when the difference between supply voltage 12 and the voltage $V_L$ across solenoid 16 is large. Denoting supply voltage 12 as $V_S$ and given $V_S$, $V_L$, and $R_L$, the dissipated power in control element 14 is equal to $(V_S-V_L) \times V_L/R_L$. The wasted power is dissipated as heat in control element 14 This dissipation is undesirable for two reasons. First, the dissipated power reduces the overall power budget of the system and may violate a power limit imposed by a customer on the MFC. Also, the heat generated through control element 14 may cause problems due to a lack of forced cooling such as a fan inside the unit.

Therefore, it is desirable for a solenoid driver to dissipate as little heat as possible so that the need for a cooling mechanism is reduced or eliminated. Also, it is desirable to reduce the energy consumption of the control element in a solenoid driver so that the control element minimizes the demands placed on the overall power budget of the system.

SUMMARY OF THE INVENTION

The present invention provides a system and method for driving a solenoid that substantially eliminates or reduces disadvantages and problems associated with previously developed systems and methods for driving a solenoid.

More specifically, the present invention provides a system and method for a pulse width modulated (PWM) solenoid driver. The system for driving a solenoid includes a solenoid, a current set-point for establishing a desired current flow through the solenoid, and a step-down regulator circuit for controlling the current through the solenoid based on the difference between the desired current flow and the actual current flow through the solenoid.

The present invention provides an important technical advantage by reducing the amount of power wasted due to dissipation through a control element such as a transistor. The step-down regulator provides a minimal voltage drop due to the low resistance associated with it. Therefore, minimal power is dissipated through the internal resistance of the step-down regulator. This reduces the overall power budget needed to drive the solenoid and consequently reduces the cost associated with implementing the solenoid driver.

Another technical advantage of the present invention is that heat associated with the loss of energy through a control element such as a transistor used in a typical solenoid driver is much reduced. Therefore, the necessity of forced cooling such as a fan inside the unit is eliminated.

BRIEF DESCRIPTION OF THE DRAWINGS

A more complete understanding of the present invention and the advantages thereof may be acquired by referring to the following description, taken in conjunction with the accompanying drawings in which like reference numbers indicate like features and wherein:

FIG. 1 is a basic linear control circuit for a controller with a transistor as a control element;

FIG. 2 is a basic circuit for a pulse width modulated solenoid current controller with the switch closed;

FIG. 3 is a basic circuit for a pulse width modulated solenoid current controller with the switch open;

FIG. 7 is a table containing the component values for one embodiment of the circuit illustrated in FIG. 6.

DETAILED DESCRIPTION OF THE INVENTION

Figure 4:
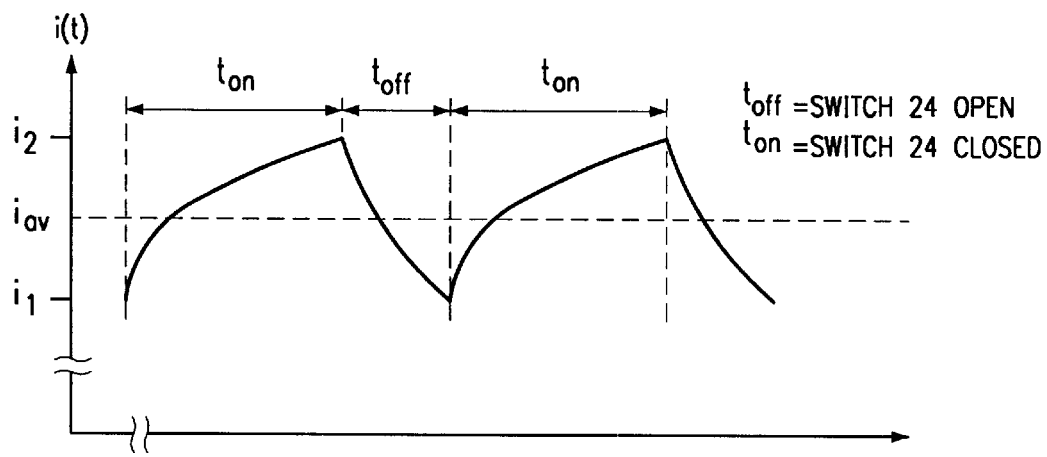
FIG. 4 is a graphical representation of the peak-to-peak current in the solenoid of FIGS. 2 and 3.

Preferred embodiments of the present invention are illustrated in the FIGUREs, like numerals being used to refer to like and corresponding parts of various drawings.

The present invention provides a system and method for the application of a step-down regulator to solenoid power control. More specifically, the present invention provides a system for driving a solenoid. The system includes a solenoid, a current set-point for establishing a desired current flow through the solenoid, and a step-down regulator circuit for controlling the current through the solenoid based on the difference between the desired current flow and the actual current flow through the solenoid.

A basic circuit for Pulse Width Modulated (PWM) is solenoid current controller 20 is shown in FIG. 2 and FIG.

3. In this circuit, a voltage source 22 is tied in series with an electronic switch 24 which can be controlled by a switch controller. Electronic switch 24 is tied in series with a load consisting of a solenoid 26 tied in parallel with diode 32. Solenoid 26 is represented as inductance 28 in series with resistance 30. FIG. 2 represents the state of the circuit when electronic switch 24 is closed, while FIG. 3 represents the state of the circuit when electronic switch 24 is open. When electronic switch 24 is closed, as in FIG. 2, current builds up on the load represented by the resistance 30 and the inductance 28 of solenoid 26. The current built up in this "on" period is stored in inductance 28. When electronic switch 24 is open, as shown in FIG. 3, the stored current in the inductance 28 decays due to the reverse voltage drop caused by the resistance 30 and the voltage drop across diode 32. The equivalent steady-state drive voltage VSSD applied across solenoid 26 through implementing this switched power source is $V_{SSD}=V*[t_{on}/(t_{on}+t_{off})]$, where V is voltage source 22, $t_{on}$ is the length of time the switch is closed and $t_{off}$ is the length of time the switch is open.

FIG. 4 is a graphical representation of the peak-to-peak current in solenoid 26 during the opening and closing of electronic switch 24. The peak-to-peak current i(t) depends on inductance 28 and resistance 30 and the period of the PWM signal, $(t_{on}+t_{off})$. Current control can be achieved if the on/off periods of electronic switch 24 are controlled appropriately to maintain the desired current level i(t) in solenoid 26. The ratio $[t_{on}/(t_{on}+t_{off})]$ is called the duty cycle. At the instant that electronic switch 24 is closed, the current i(t) in solenoid 26 begins to increase from its initial value $i_1$ to its final value $i_2$ at which point electronic switch 24 is opened. This increase is not instantaneous due to the fact that the current through an inductor cannot change instantaneously. Instead, an exponential curve is seen between the closing of electronic switch 24 and the opening of electronic switch 24. Likewise, when electronic switch 24 is opened, the current i(t) in inductance 28 begins to decay exponentially from the initial value of 12 to the final value of $i_1$ when electronic switch 24 is closed again. This process repeats itself as timed by the opening and closing of electronic switch 24. The average value $i_{AV}$ for the current through solenoid 26 is approximately equal to $[(i_1+i_2)/2]$.

Figure 5:
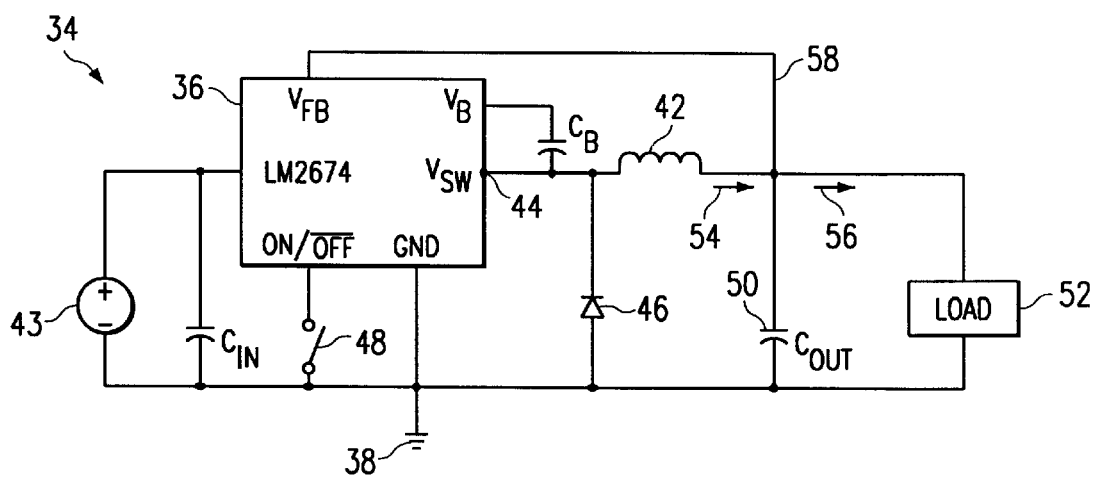
FIG. 5 is a typical circuit for a 5 volts step-down regulator.

FIG. 5 is a 5-volt step-down switching regulator 34. The heart of this circuit is step-down regulator integrated circuit 36 (buck switching regulator). Step-down regulator integrated circuit 36 may be a commercially-available, low-cost precision integrated circuit generally used in 5-volt (3.3-volt or 2.7-volt, etc.) switching power supply controls. In FIG. 5, step-down regulator integrated circuit 36 is represented as LM2674, which is a product of the National Semiconductor Corporation of Santa Clara, Calif. This particular step-down regulator integrated circuit 36 has an internally controlled frequency of 260 kHz, PWM control, and feedback compensation and a low internal resistance of approximately 0.25 ohms. The present invention is not limited to the LM2674 device. Many step-down regulators exist on the market and can be used in the present invention as well. Typical ranges for internal resistances of step-down regulators on the market range from approximately 0.1 to 1 ohm.

Step-down regulator integrated circuit 36 is normally referenced to ground 38 and generates a 5-volt output at node 40 and thus across storage capacitor 50. The 5-volts seen at node 40 is maintained by switching a suitably-sized inductor 42 between positive switching voltage supply 44 and the 5-volt output at node 40 during the "on" period and between ground 38 and the 5-volt output at node 40 during the "off" period. When inductor 42 is tied between positive switching voltage 44 and the 5-volt output at node 40, positive switching voltage 44 is tied to input voltage 43 (8 volts or greater) through the switching device within step-down controller 36.

The switching voltage supply 44 of inductor 42 is also connected to a cathode of diode 46. The anode of diode 46 is grounded to provide a current path in the "off" period. Storage capacitor 50 is connected between u 5-volt output at node 40 and ground 38. Load 52, requiring a 5-volt supply voltage, is connected in parallel with storage capacitor 50 via node 40. When step-down regulator integrated circuit 36 is first turned on with switch 48 opened, 5-volt output 40 across storage capacitor 50 is zero (the voltage across a capacitor cannot change instantaneously). Therefore, the full switching voltage supply 44 is applied to inductor 42 for the maximum pulse width within the PWM period. Inductor current 54 begins to flow through inductor 42 and can be maintained through diode 46 even when the power is removed from inductor 42 during the "off" portion of the control cycle. Inductor current 54 will be built up during subsequent on/off cycles until equilibrium is established between inductor current 54 and load current 56.

In the steady-state operating mode for the circuit in FIG. 5, the 5-volt output at node 40 and across storage capacitor 50 is precisely regulated by the control circuits inside step-down regulator integrated circuit 36. Should load current 56 increase or decrease from the steady-state level, feedback control $V_{FB}$ will cause step-down regulator integrated circuit 36 to respectively increase or decrease the duty cycle $[t_{on}/(t_{on}+t_{off})]$ of switching voltage supply 44 so that the 5-volt output at node 40 across load 52 is maintained. Similarly, if the 5-volt output at node 40 increases or decreases, the pulse width of the switching voltage supply 44 is respectively decreased or increased to maintain 5 volts across load 52.

Figure 6:
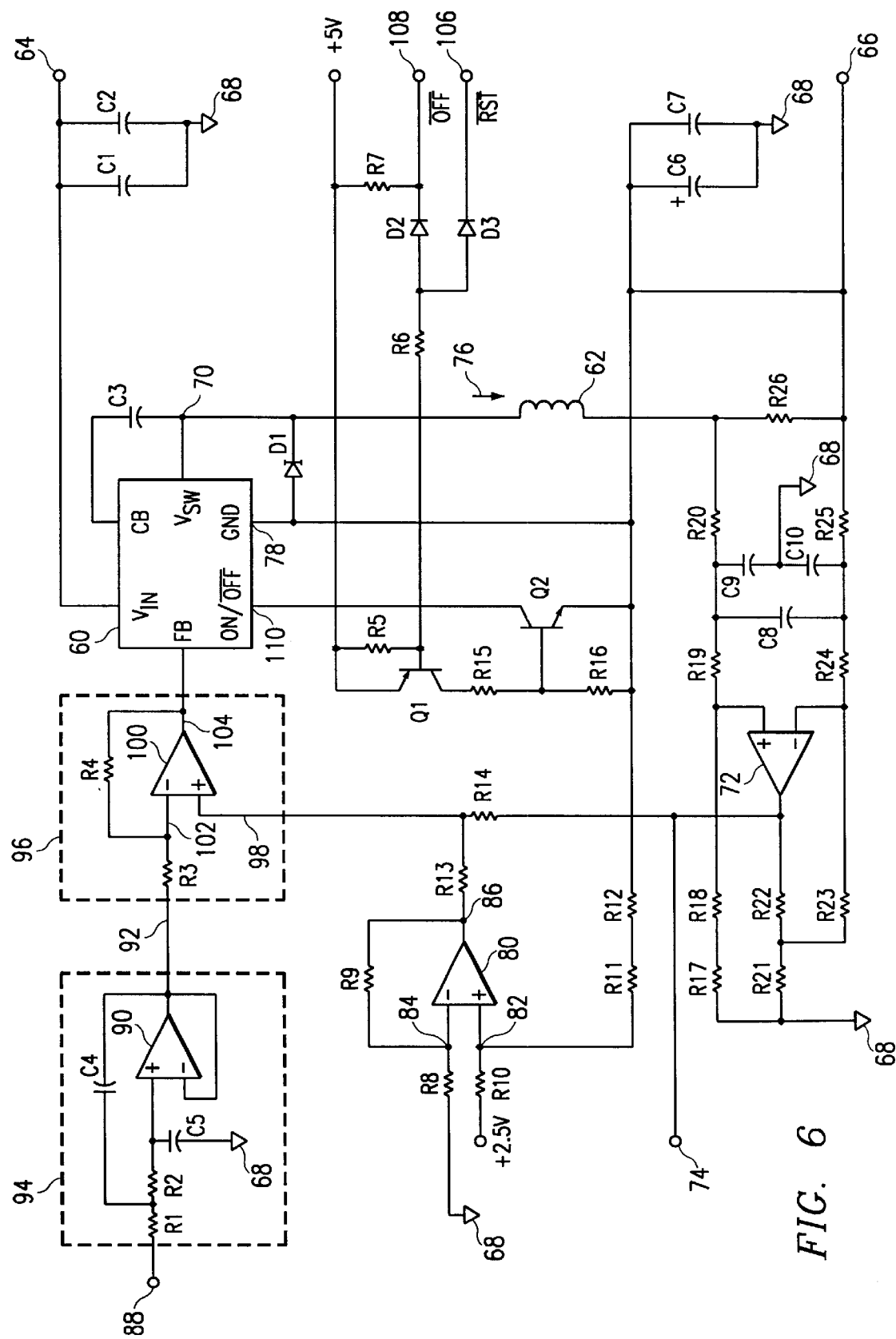
FIG. 6 is one embodiment of the present invention for a PWM system for governing the current through a solenoid that controls a valve in a mass flow controller.

One embodiment of the present invention is shown in FIG. 6. This circuit incorporates the use of step-down regulator integrated circuit 60 for current control in solenoid 62. The step-down regulator may include an input voltage pin, a feedback voltage pin, a reset pin, a ground pin, and a switching voltage pin.

Solenoid 62 may control a valve in a mass flow controller (MFC). Step-down regulator integrated circuit 60 is supplied from positive voltage supply 64 and negative voltage supply 66. The voltage lines for positive supply voltage 64 and negative supply voltage 66 are filtered with capacitor pairs $C_1, C_2$, and $C_6, C_7$. Filtering can protect the supply lines and any other circuitry connected to the supply lines from transients created by the switching action of step-down regulator integrated circuit 60. The ranges for positive supply voltage 64 and negative supply voltage 66 can be respectively ($^+$12 volts–$^+$18 volts) and ($^-$12 volts–$^-$18 volts) with respect to ground 68.

Solenoid 62 is connected between switching voltage 70 of step-down regulator integrated circuit 60 and negative supply voltage 66 through current-sensing resistor $R_{26}$. Diode $D_1$ is also connected between switching voltage 70 of step-down regulator integrated circuit 60 and negative supply voltage 66. The small voltage drop (typically a few hundred mV at full solenoid current) across current-sensing resistor $R_{26}$ may be amplified by operational amplifier 72 and supporting components ($R_{17-25}, C_{8-10}$) to generate voltage analog 74 of solenoid current 76. Operational amplifier 72 can be connected as a differential amplifier with inputs referenced to ground 68. Therefore, using component values listed in FIG. 7, at 0 mA current, voltage analog 74 of solenoid current 76 is 0 v, and at 110 mA voltage analog 74 of solenoid current 76 is 5 volts.

Step-down regulator integrated circuit 60 requires that feedback voltage 104 is 5 volts above the potential of regulator ground 78 when solenoid current 76 through solenoid 62 matches a desired solenoid current required to activate the valve in the MFC. Regulator ground 78, however, is tied to negative supply voltage 66. Voltage analog 74, therefore, must be shifted negatively by $-V_2+5$ volts, where $-V_2$ is negative supply voltage 66. This task can be performed by operational amplifier 80 and its supporting components ($R_{8-13}$). Assuming that the value of $R_{12}$ is negligible compared to $R_{11}$, and using the values of resistance specified in FIG. 7 for $R_{8-13}$, plus node voltage 82 of operational amplifier 80 is equal to:

$$(2.5 + V_2)\frac{R_{11}}{(R_{11} + R_{10})} - V_2 = \frac{(5 - V_2)}{3} \quad [\text{EQN 1}]$$

In the linear operating mode, minus node voltage 84 of operational amplifier 80 must match that of plus node voltage 82 of operational amplifier 80 within a negligible offset voltage. Therefore, those voltages will be equal only if, $$\frac{(5 - V_2)}{3} = V_B \frac{R_8}{R_8 + R_9} \quad [\text{EQN 2}]$$

where $V_B$ is bias voltage 86, the output voltage of operational amplifier 80. Thus, solving for bias voltage 86 with the indicated component values specified in FIG. 7 yields, $$V_B = 5 - V_2 \quad [\text{EQN 3}]$$

Flow set-point voltage 88 is input to operational amplifier 90 and corresponding components ($R_1,R_2,C_4,C_5$). Flow set-point voltage 88 may be established by a digital signal processor which is part of a MFC. The digital signal processor may include software that compares the value of the flow rate through the valve of the MFC with the desired flow rate. The software then may generate a valve set-point voltage 88. The valve set-point voltage 88 is used to create a set-point voltage 92 that is used to generate feedback voltage 104. Set-point voltage 92 is compared to a proportionally scaled and shifted voltage analog 74. The difference between set-point voltage 92 and voltage analog 74 is used by the step-down regulator integrated circuit 60 to determine the pulse width of switching voltage 70 which, in turn, controls solenoid current 76.

Valve set-point voltage 88 is connected to operational amplifier 90 and supporting components $R_{1-2},C_{4-5}$ to form active lowpass filter 94. Active lowpass filter 94 may have a −3 dB attenuation at 59.2 Hz and a 0.686 damping coefficient (approximate Butterworth lowpass filter response) with component values in FIG. 7. Note that a Butterworth filter response is not required here. This could have been accomplished with other filters such as a Chebyshev or a Bessel filter, yet a Butterworth filter provides a flat frequency response with moderate time domain overshoot. Valve set-point voltage 88 can be either a steady DC level between 0 and 5 volts or a pulse width modulated signal at 610 (or greater) pulses per second (pps). Active lowpass filter 94 can reduce the fundamental or 610 Hz component by a factor of 100, the second harmonic by a factor of 200, and so on. Thus, the output of active lowpass filter 94 is set-point voltage 92 which may either be a DC set-point voltage or an average PWM set-point voltage, both ranging from 0 volts to 5 volts.

Set-point voltage 92, the voltage analog 74, and the bias voltage 86 are combined in a differential 10 amplifier stage 96. Using the component values as specified in FIG. 7, plus node voltage 98 of operational amplifier 100 is given by, $$[V(i) - (5 - V_2)]\frac{R_{13}}{R_{13} + R_{14}} + 5 - V_2 = V(i) + \frac{5 - V_2}{2}, \quad [\text{EQN 4}]$$

where V(i) represents voltage analog 74 of solenoid current 76. Using the component values in FIG. 7, the voltage at minus node 102 of operational amplifier 100 is given by, $$(V_{sp} - V_{FB})\frac{R_4}{R_3 + R_4} + V_{FB} = \frac{V_{sp} + V_{FB}}{2}, \quad [\text{EQN 5}]$$

where $V_{SP}$ is set-point voltage 92 and $V_{FB}$ is feedback voltage 102. Setting equation 4 equal to equation 5 yields, $$V_{FB} = V(i) - V_{SP} + (5 - V_2). \quad [\text{EQN 6}]$$

The output of operational amplifier 100, $V_{FB}$, is feedback voltage 102 consisting of the difference between voltage analog 74 and set-point voltage 92. Feedback voltage 74 is biased 5 volts above negative supply voltage 66 ($-V_2$), satisfying the operational needs of step-down regulator integrated circuit 60.

In the event of an initialization process of the digital signal processor of an MFC, it may be desirable to disable the PWM solenoid driver shown in FIG. 6 until the initialization is complete. Also in the event of an emergency shut-off or maintenance it may also be necessary to disable the PWM solenoid driver. In either case, transistor Q1 and transistor Q2, in conjunction with resistive components $R_{5-7}$, $R_{12}$, $R_{15-16}$ and diodes D1 and D2, can provide a means to disable the PWM solenoid driver circuit illustrated in FIG. 6.

Reset node 106 or OFF node 108 can be driven to near ground level so that transistor Q1 turns on and its collector is pulled to 5 volts. The collector of transistor Q1 is tied to the base of transistor Q2 through R15. Biasing the base of transistor Q2 this way can cause transistor Q2 to turn on. In turn, ON/OFF pin 110 of step-down regulator integrated circuit 60 can be pulled to negative supply 66 and step-down regulator integrated circuit 60 can be turned off. If reset node 106 or OFF node 108 is not pulled low (i.e. tied to +5V or left floating), then both transistor Q1 and transistor Q2 can be disabled, ON/OFF pin 110 remains disconnected from negative supply voltage 66, and step-down regulator integrated circuit 60 remains on. Resistor $R_{12}$ can be used to bias output 86 of operational amplifier 80 slightly positive in order to ensure that step-down regulator integrated circuit 60 is shut off when set-point voltage 92 is 0 volts.

The present invention may be used to drive a valve in a mass flow controller. The mass flow controller may include a flow sensor with interface circuitry, sensor linearization, derivative control, proportional control, and a closed loop control algorithm. Reference is made to the flow sensor interface circuitry disclosed in U.S. patent application Ser. No. 09/350,746 filed Jul. 9, 1999 by T. I. Pattantyus et. al. entitled "Improved Mass Flow Sensor Interface Circuit". In addition, reference is made to the linearization method disclosed in U.S. patent application Ser. No. 09/350,747 filed Jul. 9, 1999, by T. I. Pattantyus and F. Tariq entitled "Method and System for Sensor Response Linearization". Reference is also made to the derivative control method disclosed in U.S. patent application Ser. No. 09/351,120 filed on Jul. 10, 1999, by E. Vyers, et al., entitled "A System and Method For A Digital Mass Flow Controller". Additionally, reference is made to the proportional control method disclosed in U.S. patent application Ser. No. 09/351,098 filed on Jul. 10, 1999, to E. Vyers, entitled "System and Method for a Variable Gain Proportional-Integral (PI) Controller." Lastly, reference is made to the advanced digital control algorithm disclosed in U.S. patent application Ser. No. 09/350,744 filed on Jul. 9, 1999 by K. Tinsley entitled "System and Method of Operation of a Digital Mass Flow Controller". It is important to note that the present invention is not limited to use in a mass flow controller including the above components.

There are many sources, data sheets, application reports giving detailed descriptions of step-down regulators. Reference is made here to the National Semiconductor Data Sheet titled "LM2674 SIMPLE SWITCHER® Power Converter High Efficiency 500 mA Step-Down Voltage Regulator," September, 1998. It is important to note that use is not limited to the National Semiconductor device. Other regulator ICs may be used as well.

A technical advantage of the circuit is that little power is wasted in step-down regulator integrated circuit 60. The amount of power dissipated by the solenoid driver illustrated in FIG. 6 depends on all of the components including solenoid 62, diode D1, positive supply voltage 64, negative supply voltage 66, and step-down regulator integrated circuit 60. Little power is dissipated by step-down regulator integrated circuit 60 when step-down regulator integrated circuit 60 is on because the voltage drop across step-down regulator integrated circuit 60 is minimized by careful design. The careful design enables a low internal resistance in step-down regulator integrated circuit 60 (~0.1—~1.0 ohm). The voltage across diode D1 during the "off" cycle (when the switch internal to step-down regulator integrated circuit 60 is open) is also small, especially if a Schottky diode is used. Consequently, most of the power dissipated in the circuit of FIG. 6 is spent on maintaining solenoid current 76. Due to the low internal resistance of step-down regulator integrated circuit 60, step-down regulator can have a reduced rate of power consumption compared to the power consumed by prior art control elements. Consequently, the solenoid driver circuit may have a lower rate of power consumption than prior art methods.

Another technical advantage of the present invention is that voltage analog 74 is used to serve two purposes. The first purpose is that it can be used as an indication to the user that the MFC is operating properly. Second, it is used as a dynamic feedback signal which is compared to set-point voltage 92 (a function of valve set-point voltage 88) to determine feedback voltage 104 of step-down regulator integrated circuit 60. Feedback voltage 104 controls the duty cycle of switching voltage 70 across solenoid 62 and, in turn, controls solenoid current 76.

An additional advantage provided by most of the commercial step-down regulator integrated circuits is the built-in short circuit protection. If solenoid 62 is short circuited, the output current of step-down regulator integrated circuit 60 will exceed the maximum allowable limit which causes the switching voltage 30 to be turned off almost instantaneously. The circuit in FIG. 6 can be run with a shorted output indefinitely without any damage to any part of the circuit.

Although the present invention has been described in detail herein with reference to the illustrative embodiments, it should be understood that the description is by way of example only and is not to be construed in a limiting sense. It is to be further understood, therefore, that numerous changes in the details of the embodiments of this invention and additional embodiments of this invention will be apparent to, and may be made by, persons of ordinary skill in the art having reference to this description. It is contemplated that all such changes and additional embodiments are within the spirit and true scope. of this invention as claimed below.

What is claimed is:

1. A pulse width modulated solenoid driver with a reduced rate of power consumption comprising:

a solenoid;

a flow set-point voltage for establishing a desired current flow through said solenoid;

a step-down regulator circuit for controlling said actual current flow through said solenoid based on a difference between said desired current and said actual current flow through said solenoid; wherein said step-down regulator comprises an input voltage pin, a feedback voltage pin, a reset pin, a ground pin, and a switching voltage pin;

a first supply voltage tied to said input voltage pin of said step-down regulator;

a first terminal of said solenoid tied to said switching voltage pin;

a second terminal of said solenoid tied in series to a current-sensing resistor which is also tied to a second supply voltage;

a cathode of a diode tied to said switching voltage pin;

an anode of said diode tied to a third supply voltage;

a first amplifier stage for filtering and amplifying a voltage across said current-sensing resistor to generate a voltage analog of said actual current flow through said solenoid;

said ground pin of said step-down regulator tied to said third supply voltage, wherein said feedback voltage pin is biased at a step-down regulator operationally determined voltage above said ground pin voltage when said actual current flow through said solenoid matches said desired current flow; and a second amplifier stage for negatively shifting said voltage analog of said actual current flow through said solenoid by a sum of said second supply voltage and said step-down regulator operationally determined voltage to generate a scaled and biased voltage analog of said actual current flow.

2. The pulse width modulated solenoid driver of claim 1, wherein said second amplifier stage comprises an operational amplifier and resistive components, said second amplifier stage is a times-two, non-inverting amplifier.

3. The pulse width modulated solenoid driver of claim 1, further comprising a third amplifier stage for filtering said flow set-point voltage to generate a set-point voltage.

4. The pulse width modulated solenoid driver of claim 3, wherein said third amplifier stage is a low-pass filter comprising an operational amplifier and resistive and capacitive components, said resistive and capacitive components determining a cut-off frequency of said low-pass filter.

5. The pulse width modulated solenoid driver of claim 3, further comprising a fourth amplifier stage for comparing said scaled and biased voltage analog of said actual current flow and said set-point voltage to generate a feedback voltage for said feedback voltage pin on said step-down regulator, said step-down regulator generating a duty cycle for a switching voltage at said switching pin in response to said feedback voltage.

6. The pulse width modulated solenoid driver of claim 5, wherein said fourth amplifier stage comprises an operational amplifier and resistive components.

7. The pulse width modulated solenoid driver of claim 5, wherein said solenoid controls a valve in a mass flow controller.

8. The pulse width modulated solenoid driver of claim 7, wherein said flow set-point voltage is determined by a digital signal processor in said mass flow controller.

9. The pulse width modulated solenoid driver of claim 8, wherein said digital signal processor compares an actual flow through said valve and calculates said flow set-point voltage based on a desired flow through said valve, said desired flow through said valve is a function of said desired current flow.

10. The pulse width modulated solenoid driver of claim 9, further comprising circuitry to generate a reset signal connected to said reset pin on said step-down regulator.

11. A method for driving a solenoid in a pulse width modulated solenoid driver with a reduced rate of power consumption, said method comprising:
  generating an actual current flow through said solenoid using a pulse width modulated signal output from a step-down regulator, wherein said step-down regulator comprises:
    an input voltage pin;
    a feedback voltage pin, a reset pin;
    a ground pin, and a switching voltage pin; and
    wherein the steps of generating said actual current flow through said solenoid further comprises;
      connecting a first supply voltage to said input voltage pin of said step-down regulator;
      connecting a first terminal of said solenoid to said switching voltage pin;
      connecting a second terminal of said solenoid to a first terminal of a current-sensing resistor;
      connecting a second terminal of said current-sensing resistor to a second supply voltage;
      connecting a cathode of a diode to said switching voltage pin;
      connecting an anode of said diode to a third supply voltage; and
      connecting said ground pin of said step-down regulator to said third supply voltage;
  converting said actual current flow through said solenoid to a voltage analog of said actual current flow through said solenoid, wherein the step of converting said actual current flow through said solenoid further comprises;
    the step of amplifying and filtering with a first amplifier stage a voltage across said current-sensing resistor to generate said voltage analog of said actual current flow through said solenoid;
  generating an error signal that is a function of a set-point voltage and said voltage analog of said actual current flow through said solenoid, said set-point voltage is a function of a desired current flow through said solenoid, wherein the step of generating an error signal further comprises:
    negatively shifting with a second amplifier stage said voltage analog of said actual current flow through said solenoid by the sum of said second supply voltage and said step-down regulator operationally determined voltage to generate a scaled and biased voltage analog of said actual current flow; and
    feeding back said error signal to said step-down regulator to alter a pulse width of said pulse width modulated signal, wherein said feedback voltage pin is biased at a step-down regulator operationally determined voltage above said ground pin voltage when said actual current flow through said solenoid matches said desired current flow.

12. The method of claim 11, wherein said second amplifier stage comprises an operational amplifier and resistive components, said second amplifier stage is a times-two, non-inverting amplifier.

13. The method of claim 11, wherein the step of generating said error signal further comprises filtering aid flow set-point voltage with a third amplifier stage to generate said set-point voltage.

14. The method of claim 13, wherein said third amplifier stage is a low-pass filter comprising an operational amplifier and resistive and capacitive components, said resistive and capacitive components determining a cut-off frequency of said low-pass filter.

15. The method of claim 13, wherein the step of generating said error signal further comprises comparing said scaled and biased voltage analog of said actual current flow through said solenoid with said set-point voltage to generate a feedback voltage for said feedback voltage pin on said step-down regulator using a fourth amplifier stage.

16. The method of claim 15, wherein said fourth amplifier stage comprises an operational amplifier and resistive components.

17. The method of claim 15, wherein said solenoid controls a valve in a mass flow controller.

18. The method of claim 17, wherein said flow set-point voltage is determined by a digital signal processor in said mass flow controller.

19. The method of claim 18, wherein said digital signal processor compares an actual flow through said valve and calculates said flow set-point voltage based on a desired flow through said valve, said desired flow through said valve is a function of said desired current flow.

* * * * *

UNITED STATES PATENT AND TRADEMARK OFFICE
CERTIFICATE OF CORRECTION

PATENT NO. : 6,404,612 B1
DATED : June 11, 2002
INVENTOR(S) : Tamas I. Pattantyus It is certified that error appears in the above-identified patent and that said Letters Patent is hereby corrected as shown below:

<u>Title page,</u>
Item [54], replace first occurrence of "FOR" with -- AND --.

<u>Column 1,</u>
Line 24, replace "Device 4" with -- Device 14 --

<u>Column 2,</u>
Line 66, delete "is"

<u>Column 3,</u>
Line 16, replace "VSSD" with -- $V_{SSD}$ --
Line 38, replace "12" with -- $i_2$ --

<u>Column 6,</u>
Line 2, delete "10"

<u>Column 10,</u>
Line 24, replace "aid" with -- said --

Signed and Sealed this

Twenty-fourth Day of June, 2003

JAMES E. ROGAN
*Director of the United States Patent and Trademark Office*